United States Patent [19]

Thomas et al.

[11] 4,130,520

[45] Dec. 19, 1978

[54] AQUEOUS POLYESTER COATING COMPOSITION, METHOD OF MAKING, AND COATED CONDUCTOR

[75] Inventors: Charles H. Thomas, Monroeville; Barbara R. Garland, Elizabeth Township, Allegheny County, both of Pa.

[73] Assignee: Westinghouse Electric Corp., Pittsburgh, Pa.

[21] Appl. No.: 781,260

[22] Filed: Mar. 25, 1977

[51] Int. Cl.$^2$ .................. C08G 63/18; C08G 63/20; C08G 63/68

[52] U.S. Cl. .................. 260/29.2 N; 260/29.2 E; 260/29.4 R; 260/850; 428/379

[58] Field of Search ............ 260/29.2 N, 29.2 E, 260/29.4 R, 75 N

[56] References Cited

U.S. PATENT DOCUMENTS

| | | | |
|---|---|---|---|
| 3,211,585 | 10/1965 | Meyer et al. | 260/75 T |
| 3,272,785 | 9/1966 | Lewis et al. | 260/75 T |
| 3,310,512 | 3/1967 | Curtice | 260/75 T |
| 3,426,098 | 2/1969 | Meyer et al. | 260/75 N |
| 3,553,215 | 1/1971 | Zalewski et al. | 260/75 N |
| 3,652,501 | 3/1972 | Albers et al. | 260/75 N |
| 3,668,277 | 6/1972 | Riemhofer et al. | 260/75 N |
| 3,882,188 | 5/1975 | Behmel | 260/75 N |
| 4,011,185 | 3/1977 | Hosokawa et al. | 260/75 N |

*Primary Examiner*—Murray Tillman
*Assistant Examiner*—Arthur H. Koeckert
*Attorney, Agent, or Firm*—D. P. Cillo

[57] ABSTRACT

A water dispersible polyester resin solution is made by esterifying a mixture, consisting of: about 2.0 moles to about 5.0 moles of an organic, dicarboxylic acid selected from at least one, of an aromatic dicarboxylic acid, and tetrahydrophthalic acid; about 0.1 mole to about 1.5 moles of an organic, unsaturated aliphatic dicarboxylic acid; about 0.1 mole to about 6.5 moles of an organic, saturated aliphatic dicarboxylic acid; about 1.0 mole to about 5.0 moles of an organic, alicyclic dihydric alcohol; 0 mole to about 5.0 moles of an organic, aliphatic dihydric alcohol and about 0.6 mole to about 1.2 moles of a compound effective to cause cross linking; and adding an amount of organic solvent effective to provide a solution of between about 50 wt. % to about 90 wt. % solids content; wherein the esterification reaction is continued until the acid value drops to between about 45 to about 65, and wherein the mole ratio of OH/COOH = 0.30 to 0.90.

11 Claims, No Drawings

AQUEOUS POLYESTER COATING COMPOSITION, METHOD OF MAKING, AND COATED CONDUCTOR

BACKGROUND OF THE INVENTION

Polyester coating compositions in solvent form are well known in the art. These types of resin solutions pose fire and health hazards and are expensive. Curtice, in U.S. Pat. No. 3,310,512, solved the fire and health problems, by teaching an aqueous coating system containing a water dispersible polyester resin having a low acid value.

Curtice reacted an aromatic dicarboxylic acid, such as isophthalic acid with an aliphatic dicarboxylic acid, such as adipic acid, and at least two polyols, one of which must be hydrophilic, to impart water dispersibility to the final resin. The hydrophilic polyol is a polyalkylene glycol, such as polyethylene glycol and polypropylene glycol. The second polyol is selected from cyclic and aliphatic polyhydric alcohols such as neopentyl glycol, trimethylene glycol, glycerine, trimethylol ethane and trimethylol propane. The ratio of dicarboxylic acid:total polyol is 1:0.95 to 1.8, i.e., OH/COOH = 0.95 to 1.8, providing a neutral or basic solution.

In Curtice, all of the reactants are added together and heated in an esterification process, until the acid value drops to below 30. This water soluble polyester is then added to a 98% aqueous amine neutralizing solution, to form a polyester dispersion, having a pH of about 7. This dispersion can be cast as a wet film, dried, and baked at about 120° C., to provide hard, flexible films having good adhesion and solvent resistance properties. These polyesters, while providing a water dispersible system, could however, be improved in terms of increased water solubility, and improved thermal properties upon cure.

SUMMARY OF THE INVENTION

The above problems are solved by providing a water dispersible polyester resin solution, which contains an excess mole ratio of organic dicarboxylic acid over organic polyol, and the inclusion of a large percentage of organic cyclic polyols. Preferably, there is a dual reaction sequence and the reaction is continued until the acid value is between about 45 to 65.

This provides an excess of available acid, with resulting excellent water solubility, and use of major amounts of alicyclic alcohol, with resulting improved thermal properties. Major amounts of relatively water insoluble dicarboxylic acid, such as isophthalic acid, and relatively water insoluble alicyclic alcohols, such as 1–4 cyclohexane-dimethanol are included in the reaction product, by deliberately maintaining an acidic environment, i.e., maintaining a mole ratio of OH/COOH of below 0.90.

This definite acidic environment is maintained and a two-step reaction sequence is followed. A major amount of an organic, dicarboxylic acid, such as isophthalic acid and tetrahydrophthalic anhydride, and a small amount of an organic, unsaturated aliphatic dicarboxylic acid, such as maleic anhydride, is added to an organic, alicyclic dihydric alcohol, such as 1-4 cyclohexane dimethanol. These reactants are added together and then heated in an esterification process at a temperature of between about 180° C. to about 250° C., for about ½ to about 4 hours, until the acid value drops to between about 45 to 65. Then, an organic, saturated aliphatic dicarboxylic acid, such as adipic acid, is added to provide a flexible product. The esterification reaction is continued at about 180° C. to about 250° C., for about 5 to 10 hours, and the acid value maintained between about 45 to 65, preferably 50 to 60.

The mole ratio of dicarboxylic acid:total polyol must be from 1:0.30 to 0.90, i.e., OH/COOH = 0.30 to 0.90, providing an acidic condition. Aqueous melamine-formaldehyde solution is added, to finally dilute the polyester and to form a polyester dispersion of about 60 wt.% solids content. Then, the pH is adjusted to between about 8 and 9, and the dispersion is made completely water soluble, by the addition of an effective amount of an aliphatic organic amine. The formulations, having a viscosity of between about 4,000 cps. to 20,000 cps. at 25° C., were found to be infinitely soluble in water. They were easily coatable and castible to form solid low temperature curing films. The films could be coated onto a wide variety of electrical conductors or substrates, to provide insulation having excellent heat resistance at up to about 200° C. (class H), low weight loss, and high bond strength.

DESCRIPTION OF THE PREFERRED EMBODIMENTS

In the method of this invention, about 2.0 moles to about 5.0 moles of a dicarboxylic acid selected from the group consisting of aromatic dicarboxylic acids and tetrahydrophthalic acid or anhydride, and mixtures thereof, and about 0.1 mole to about 1.5 moles of an unsaturated aliphatic dicarboxylic acid are added to about 1.0 mole to about 5.0 moles of an alicyclic, dihydric alcohol and 0 mole to about 5.0 moles, preferably about 0.1 mole to about 5.0 moles, of an aliphatic dihydric alcohol. Generally, about 0.6 mole to about 1.2 moles of a suitable organic branching agent effective to cross link the acids and alcohols is added, along with an effective amount of a saturated aliphatic dicarboxylic acid, and an esterification reaction is conducted. Then the mixture is reduced to about 50 wt.% to about 90 wt.%, and preferably about 75 wt.% to about 85 wt.%, solids, with a suitable organic solvent having a high boiling point.

The esterification reaction is generally conducted, in a suitable reaction vessel containing all the ingredients except the saturated aliphatic dicarboxylic acid, at a temperature of between about 180° C. to about 250° C., for a time effective to drop the acid value to between about 45 to 60, generally about ½ to about 4 hours. The reaction mixture is then generally cooled to between about 135° C. and 160° C., and about 0.1 mole to about 6.5 moles of a saturated aliphatic dicarboxylic acid is added as the last ingredient, to provide flexibility in the cured reaction product. The reaction is continued at a temperature of between about 180° C. to about 250° C., for a time effective to drop the acid value to between about 45 to 65, and preferably 50 to 60, generally about 5 to 10 hours, to form a polyester resin to which organic solvent is added to form a solution.

The polyester resin solution is then added to an aqueous melamine formaldehyde solution to provide a polyester dispersion of between about 50 wt.% to 70 wt.% solids. The pH of the polyester is adjusted to between about 8 and 9, and the polyester is made infinitely soluble in the water by addition of an effective amount of an organic aliphatic amine. The final OH/COOH mole ratio will range from 0.30 to 0.90. The viscosity of the final solution will range from about 4,000 cps. to 20,000 cps. at 25° C.

Suitable dicarboxylic acids include aromatic dicarboxylic acids, for example, phthalic acid; isophthalic acid; and terephthalic acid, and tetrahydrophthalic acid, and their mixtures, where the term "acid" is meant to also include corresponding anhydrides. Suitable unsaturated aliphatic dicarboxylic acids include, for example, maleic acid, and fumaric acid, their anhydrides and their mixtures. Suitable alicyclic, dihydric alcohols include, for example, 1,4-cyclohexane dimethanol, 1,2-cyclopentane diol and 1,2-cyclohexane diol and their mixtures. Suitable aliphatic, dihydric alcohols include, for example, neopentyl glycol, ethylene glycol, propylene glycol, 1,3-propane diol, 1,2-butane diol, and 1,4-butane diol. Suitable saturated aliphatic dicarboxylic acids include, for example, adipic acid, succinic acid, glutaric acid, pimelic acid, suberic acid, azelaic acid and sebacic acid, their anhydrides and their mixtures.

Useful compounds effective to help cross linking during the esterification reaction include, for example, tris (2 hydroxy alkyl) isocyanurate, where alkyl is from 2 to 6 carbons, particularly tris (2 hydroxy ethyl) isocyanurate, and organic polyhydric alcohols containing more than two hydroxyl groups per molecule, such as trimethylol propane, glycerin, pentaerythritol, dipenterythritol, trimethylol ethane, sorbitol, erythritol, and inositol and their mixtures. Suitable organic solvents include, for example, ethylene glycol monoalkyl ethers, such as glycol monobutyl ether (butyl Cellosolve) and diethylene glycol monobutyl ether (butyl Carbitol); ethylene glycol monoalkyl acetates; ketones and glycols and their mixtures, having flash points over about 150° C. Preferred solvents are butyl Cellosolve and butyl Carbitol.

These materials are reacted and then diluted with a partially methylated melamine formaldehyde resin effective to improve the gel time of the final solution, such as hexamethoxymethyl melamine. The diluted polyester dispersion is finally pH adjusted, and made completely water soluble by the addition of an effective amount of an organic aliphatic amine such as triethanol amine; triethylamine; 2 amino-2-methyl-1 propanol, dimethylamino-2-methyl-1 propanol and dimethylethanol amine and their mixtures.

EXAMPLE 1

A water dispersible polyester insulating resin was made by adding 2.3 moles (390 grams) of isophthalic acid (aromatic dicarboxylic acid); 0.5 mole (82 grams) of tetrahydrophthalic anhydride; 0.9 mole (85 grams) of maleic anhydride (unsaturated aliphatic dicarboxylic acid) to 1.5 moles (216 grams) of 1-4 cyclohexanedimethanol (alicyclic dihydric alcohol); 2.9 moles (301 grams) of neopentyl glycol (aliphatic dihydric alcohol); and 0.3 mole (87 grams) of tris (2 hydroxyethyl) isocyanurate (branching agent).

These ingredients were reacted by slow heating to 210° C., over a period of about 2 hours, where an acid value of 50 was reached. The reaction mixture was then cooled to 150° C. Then, 1.8 moles (263 grams) of adipic acid (saturated aliphatic dicarboxylic acid) was added. The reaction admixture was then slowly heated to 210° C. where an acid value of about 55 was reached. Total heating time was about 8 hours. At this point 483 grams of butyl Cellosolve solvent was added. This provided a polyester resin solution incorporating a major amount of mixture of aromatic dicarboxyic acid and tetrahydrophthalic anhydride and alicyclic polyol and having a mole ratio of OH/COOH of $(1.5+2.9)/(2.3+0.5+1.8) = 0.8$, providing an acidic condition.

After the polyester resin cooled to 25° C., aqueous 25% hexamethoxymethyl melamine and tap water was added in an amount effective to reduce the solids content of the polyester resin to 60 wt.%. Dimethylethanolamine was added in an amount effective to increase the pH to about 8.5. The polyester resin dispersion was clear, had a viscosity of about 5,000 cps., and was found to be infinitely soluble in water.

Tests were then run to determine the gel time, cake hardness, weight loss, bond strength and temperature capability of the resin. The results of these tests are shown in Table 1 below:

TABLE 1

| GEL TIME | WEIGHT LOSS % | | | | | | BOND STRENGTH | |
|---|---|---|---|---|---|---|---|---|
| | 200° C | | | 250° C | | | 2 mils, 4 hrs cure 150° C | |
| 135° C | 8 | 100 | 400 hrs | 8 | 100 | 400 hrs | 25° C | 100° C |
| 140 min | 7% | 15% | 24% | 13% | 23% | 26% | 26 lbs. | 5 lbs. |

Results of I.E.E. No. 57 Twisted Pair Test showed a thermal rating of 195° C. to 200° C. This provided a class H (180° C.+ thermal rated) polyester insulating varnish with good bond strength and weight loss properties. The polyester varnish was easily coated onto copper electrical conductors and cured to provide an excellent insulation.

EXAMPLE 2

A water dispersible polyester insulating resin was made using the same ingredients and method as in EXAMPLE 1, except that 513 grams of butyl Cellosolve was used and the neopentyl glycol was eliminated and substituted for by increasing the 1-4 cyclohexanedimethanol content up to 4.4 moles (634 grams).

The polyester resin had a mole ratio of OH/COOH of $(4.4)/(2.3+0.5+0.9+1.8) = 0.8$, providing an acidic condition. After the polyester resin cooled to 25° C., aqueous 25% hexamethoxymethyl melamine and tap water was added in an amount effective to reduce the solids content of the polyester resin to 60%. Dimethylethanolamine was added in an amount effective to increase the pH to about 8.5. The polyester resin dispersion was clear; had a viscosity of about 18,000 cps., and was infinitely soluble in water. The results of tests are shown in Table 2 below:

TABLE 2

| GEL TIME | WEIGHT LOSS % | | | | | | BOND STRENGTH | |
|---|---|---|---|---|---|---|---|---|
| | 200° C | | | 250° C | | | 2 mils, 4 hrs cure 150° C | |
| 135° C | 8 | 100 | 400 hrs | 8 | 100 | 400 hrs | 25° C | 100° C |
| 150 min | 6% | 14% | 18% | 11% | 16% | 18% | 27 lbs. | 7 lbs. |

Results of I.E.E. No. 57 Twisted Pair Test showed a thermal rating of 195° C. to 200° C. This provided a class H (180° C.+ thermal rated) insulating varnish with good bond strength and excellent weight loss properties.

EXAMPLE 3

A water dispersible polyester insulating resin was made using the same ingredients and method as in EXAMPLE 1, except that the isophthalic anhydride content was increased to 2.6 moles (426 grams), the adipic acid content was decreased to 1.5 moles (219 grams) and 498 grams of butyl Cellosolve was used.

The polyester resin had a mole ratio of OH/COOH of $(1.5+2.9)/(2.6+0.5+0.9+1.5) = 0.8$, providing an acidic condition. After the polyester resin cooled to 25° C., aqueous 25% hexamethoxy methyl melamine and tap water was added in an amount effective to reduce the solids content of the polyester resin to 60%. Dimethylethanolamine was added in an amount effective to increase the pH to about 8.5. The polyester resin dispersion was clear, had a viscosity of about 17,000 cps., and was infinitely soluble in water. The results of tests are shown in Table 3 below:

TABLE 3

| GEL TIME | | WEIGHT LOSS % | | | | | BOND STRENGTH | |
|---|---|---|---|---|---|---|---|---|
| 135° C | | 200° C | | | 250° C | | 2 mils, 4 hrs cure 150° C | |
| | 8 | 100 | 400 hrs | 8 | 100 | 400 hrs | 25° C | 100° C |
| 200 min | 6% | 17% | 24% | 13% | 26% | 29% | 28 lbs. | 9 lbs. |

Results of I.E.E. No. 57 Twisted Pair Test showed a thermal rating of 195° C. to 200° C. This provided a class H (180° C.+ thermal rated) insulating varnish still having acceptable gel times and providing excellent bond strength and good weight loss properties.

An insulating varnish was made as described above except that 0.3 moles of trimethylol propane was substituted for tris (2 hydroxyethyl) isocyanurate as the branching agent. The gel times and bond strengths were similar to those in Table 3 above, and the weight loss, while higher, was still acceptable.

Similarly, other aromatic dicarboxylic acids, such as phthalic acid and terephthalic acid and their anhydrides; unsaturated aliphatic dicarboxylic acids, such as fumaric acid; alicyclic dihydric alcohols, such as 1,2-cyclopentane diol and 1,2-cyclohexane diol; aliphatic dihydric alcohols, such as ethylene glycol, propylene glycol, 1,3-propane diol, 1,2-butane diol, and 1,4-butane diol; saturated aliphatic dicarboxylic acids, such as succinic acid, glutaric acid, pimelic acid, suberic acid, azelaic acid, sebacic acid and their anhydrides; branching agents, such as other hydroxy alkyl isocyanurates, glycerin, pentaerythritol, and inositol; and other organic solvents, such as acetates, ketones and glycols can be substituted for their corresponding materials used in the Examples.

EXAMPLE 4

As a comparative example, a polyester insulating resin was made having an OH/COOH mole ratio of 1. In this example no cross-linking agent was used, and the saturated aliphatic dicarboxylic acid (adipic acid) was added to the initial mix. The resin was made by adding 1 mole (166 grams) of isophthalic acid; 1 mole (152 grams) of tetrahydrophthalic anhydride; 1 mole (98 grams) of maleic anhydride; 2 moles (288 grams) of 1-4 cyclohexanedimethanol; 2 moles (208 grams) of neopentyl glycol and 1 mole (146 grams) of adipic acid.

These ingredients were reacted by slow heating to 210° C. where an acid value of about 45 to 55 was reached. The reaction mixture was then cooled to about 150° C. and 386 grams of butyl Cellosolve was added. This provided a polyester resin having a mole ratio of OH/COOH of $(2+2)/(1+1+1) = 1.0$, providing a neutral condition.

After the polyester resin cooled to 25° C., aqueous 25% hexamethoxy methyl melamine and tap water was added in an amount effective to reduce the solids content and dimethylethanolamine was added in an amount effective to increase the pH to about 8.5. When the solids content was reduced to 48%, the polyester resin dispersion became cloudy. Thus at an OH/COOH ratio of 1.0, major quantities of cyclic, thermally stable materials could not be incorporated into the polyester resin without a dramatic decrease in water solubility. The addition of adipic acid in the initial mixing step also made the reaction less controllable.

We claim:

1. A method of producing a water dispersible polyester resin solution, which comprises esterifying a mixture consisting of:
    (a) about 2.0 moles to about 5.0 moles of an organic, dicarboxylic acid selected from the group consisting of aromatic dicarboxylic acids, tetrahydrophthalic acid, and mixtures thereof,
    (b) about 0.1 mole to about 1.5 moles of an organic, unsaturated aliphatic dicarboxylic acid,
    (c) about 0.1 mole to about 6.5 moles of an organic saturated aliphatic dicarboxylic acid,
    (d) about 1.0 mole to about 5.0 mole of an organic, alicyclic dihydric alcohol,
    (e) 0 mole to about 5.0 moles of an organic, aliphatic dihydric alcohol, and
    (f) about 0.6 mole to about 1.2 moles of an organic compound selected from the group consisting of tris (2 hydroxy alkyl) isocyanurate where alkyl is from 2 to 6 carbons, and polyhydric alcohols containing more than two hydroxyl groups per molecule, and then adding an amount of organic solvent effective to provide a solution of between about 50 wt.% to about 90 wt.% solids content, and finally, diluting the polyester resin solution with a plurality methylated melamine formaldehyde resin, and adding an organic aliphatic amine in an amount effective to provide pH of between about 8 and about 9; wherein the esterification reaction is continued until the acid value drops to between about 45 and about 65, and wherein the mole ratio of OH/COOH = 0.30 to 0.90.

2. The method of claim 1, wherein ingredients (a), (b), (d), (e), and (f) are reacted until the acid value drops between about 45 to about 65 and then ingredient (c) is added; and wherein the viscosity of the polyester resin solution is between about 4,000 cps. to 20,000 cps. at 25° C.

3. The method of claim 1, wherein the aromatic dicarboxylic acid is selected from the group consisting of phthalic acid; isophthalic acid; terephthalic acid, their anhydrides and mixtures thereof; the unsaturated aliphatic dicarboxylic acid is selected from the group consisting of maleic acid; fumaric acid, their anhydrides and mixtures thereof; the saturated aliphatic dicarboxylic acid is selected from the group consisting of adipic acid; succinic acid; pimelic acid; suberic acid; azelaic acid; sebacic acid, their anhydrides and mixtures thereof; the alicyclic dihydric alcohol is selected from the group consisting of 1,4-cyclohexane dimethanol; 1,2-cyclopentane diol; 1,2-cyclohexane diol and mixtures thereof; the aliphatic dihydric alcohol is selected from the group consisting of neopentyl glycol; ethylene glycol; propylene glycol; 1,3-propanediol; 1,2-butane diol; 1,4-butane diol and mixtures thereof.

4. The method of claim 3, wherein the organic compound of (f) is selected from the group consisting of tris (2 hydroxy ethyl) isocyanurate, trimethylol propane, glycerin, pentaerythritol, dipenterythritol, trimethylol ethane, sorbitol, erythritol, insitol and mixtures thereof and the organic solvent is selected from the group consisting of ethylene glycol monoalkyl ethers, ethylene glycol monoalkyl acetates, ketones, glycols and mixtures thereof having flash points of over about 150° C., and the amine, added in the last step to adjust the pH, is selected from the group consisting of triethanol amine; triethylamine; 2 amino-2-methyl-1 propanol; dimethylethanol amine and mixtures thereof.

5. An electrical conductor, coated with a cured polyester made by the method of claim 3.

6. A method of producing a water dispersible polyester resin solution, which comprises esterifying a mixture of ingredients, by the steps of:

(A) adding:
  (a) about 2.0 moles to about 5.0 moles of an organic, dicarboxylic acid selected from the group consisting of aromatic dicarboxylic acids, tetrahydrophthalic acid, and mixtures thereof,
  (b) about 0.1 mole to about 1.5 moles of an organic, unsaturated aliphatic dicarboxylic acid,
  (c) about 1.0 mole to about 5.0 moles of an organic, alicyclic dihydric alcohol,
  (d) 0 mole to about 5.0 moles of an organic, aliphatic dihydric alcohol, and
  (e) about 0.6 mole to about 1.2 moles of an organic compound selected from the group consisting of tris (2 hydroxy alkyl) isocyanurate where the alkyl is from 2 to 6 carbons, and polyhydric alcohols containing more than two hydroxyl groups per molecule, and then (B) heating, in an esterification process, until the acid value of the mixture drops to between about 45 to 65, and then (C) adding about 0.1 mole to about 6.5 moles of an organic, saturated aliphatic dicarboxylic acid, and then (D) heating, in an esterification process, to form a polyester resin solution, wherein the mole ratio of OH/COOH = 0.30 to 0.90, while maintaining the acid value between about 45 to about 65, and then (E) adding an amount of organic solvent effective to provide a solution of between about 50 wt.% to about 90 wt.% solids content.

7. The method of claim 6, where, after step (E), the polyester resin solution is diluted with a partially methylated melamine formaldehyde resin, and as a last step an organic aliphatic amine is added in an amount effective to provide a pH of between about 8 and 9.

8. The method of claim 7, wherein the aromatic dicarboxylic acid is selected from the group consisting of phthalic acid; isophthalic acid; terephthalic acid, their anhydrides and mixtures thereof; the unsaturated aliphatic dicarboxylic acid is selected from the group consisting of malic acid; fumaric acid, their anhydrides and mixtures thereof; the saturated aliphatic dicarboxylic acid is selected from the group consisting of adipic acid; succinic acid; pimelic acid; suberic acid; azelaic acid; sebacic acid, their anhydrides and mixtures thereof; the alicyclic dihydric alcohol is selected from the group consisting of 1,4-cyclohexane dimethanol; 1,2-cyclopentane diol; 1,2-cyclohexane diol and mixtures thereof; the aliphatic dihydric alcohol is selected from the group consisting of neopentyl glycol; ethylene glycol; propylene glycol; 1,3-propanediol; 1,2-butane diol; 1,4-butane diol and mixtures thereof.

9. The method of claim 7 wherein the aromatic dicarboxylic acid is isophthalic acid; the unsaturated aliphatic dicarboxylic acid is selected from the group consisting of maleic acid and its anhydride; the saturated aliphatic dicarboxylic acid is selected from the group consisting of adipic acid and its anhydride; the alicyclic dihydric alcohol is 1-4 cyclohexanedimethanol; the aliphatic dihydric alcohol is neopentyl glycol; the organic compound of (e) is selected from the group consisting of tris (2 hydroxy ethyl) isocyanurate, trimethylol propanol and mixtures thereof; the organic solvent is selected from the group consisting of butyl "Cellosolve," and butyl "Carbitol," and their mixtures and the amine added in the last step to adjust the pH is selected from the group consisting of triethanol amine; triethylamine; 2 amino-2-methyl-1 propanol; dimethylethanol amine and mixtures thereof.

10. An electrical conductor coated with a cured polyester made by the method of claim 6.

11. A water dispersible polyester resin solution, made by the method of claim 6.

* * * * *